(12) United States Patent
Asahina

(10) Patent No.: US 7,177,289 B2
(45) Date of Patent: *Feb. 13, 2007

(54) FACILITATING COMMUNICATIONS BETWEEN A RADIO DEVICE AND A TERMINAL

(75) Inventor: Hiroshi Asahina, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,528

(22) Filed: Sep. 27, 2005

(65) Prior Publication Data

US 2006/0077948 A1    Apr. 13, 2006

Related U.S. Application Data

(63) Continuation of application No. 09/901,663, filed on Jul. 11, 2001, now Pat. No. 6,982,963.

(30) Foreign Application Priority Data

Jul. 12, 2000    (JP)    ............................... 2000-211609

(51) Int. Cl.
*H04L 12/66*    (2006.01)

(52) U.S. Cl. .................. 370/310; 370/401; 370/466

(58) Field of Classification Search ................ 370/310, 370/401, 466, 469, 474
See application file for complete search history.

(56) References Cited

U.S. PATENT DOCUMENTS

| 6,421,714 B1 * | 7/2002 | Rai et al. ..................... 709/217 |
|---|---|---|
| 6,487,201 B1 | 11/2002 | Seo ............................. 370/394 |
| 6,490,291 B1 | 12/2002 | Lee et al. .................... 370/401 |
| 6,512,754 B2 | 1/2003 | Feder et al. ................. 370/338 |
| 6,519,458 B2 | 2/2003 | Oh et al. ..................... 455/445 |
| 6,625,164 B1 | 9/2003 | Lioy et al. .................. 370/465 |
| 6,628,671 B1 | 9/2003 | Dynarski et al. ............ 370/469 |
| 6,684,256 B1 | 1/2004 | Warrier et al. .............. 709/238 |
| 6,697,352 B1 | 2/2004 | Ludwig et al. ............. 370/349 |
| 6,766,168 B1 | 7/2004 | Lim ........................ 455/435.1 |
| 6,948,108 B1 * | 9/2005 | Ludwig et al. ............. 714/748 |
| 2002/0089958 A1 * | 7/2002 | Feder et al. ................ 370/338 |

FOREIGN PATENT DOCUMENTS

| JP | 11-196130 | 7/1999 |
|---|---|---|
| JP | 2001-359153 | 12/2001 |
| JP | 2002-504780 | 2/2002 |
| WO | 99/53704 | 10/1999 |

* cited by examiner

*Primary Examiner*—Min Jung
(74) *Attorney, Agent, or Firm*—Harrity Snyder, LLP

(57) ABSTRACT

A communication device for use in connecting a mobile station to a terminal includes a first group of frame memories that correspond to radio links used to transmit data to the mobile station. The first group of frame memories is configured to store point-to-point (PPP) frames. The communication device also includes one or more radio converters that convert the PPP frames stored in the first group of frame memories into radio frames. The communication device may further include a second group of frame memories configured to store radio frames received from the mobile station via radio links. The communication device may also include a PPP converter configured to convert the radio frames stored in the second group of frame memories into PPP frames.

23 Claims, 5 Drawing Sheets

FACILITATING COMMUNICATIONS BETWEEN A RADIO DEVICE AND A TERMINAL

RELATED APPLICATION

This application is a continuation of U.S. patent application Ser. No. 09/901,663 filed Jul. 11, 2001 now U.S. Pat. No. 6,982,963, the disclosure of which is incorporated herein by reference.

BACKGROUND OF THE INVENTION

This invention relates to a communication system for use in carrying out communication between a mobile terminal or station and an IP packet terminal located within a connectionless network. Herein, it is to be noted that the mobile terminal is operable in accordance with the Digital cellular method and the IP (internet protocol) while the IP packet terminal carries out communication by the use of a packet.

With recent world wide spread of an internet and a mobile communication network, attention has been directed to a communication system for interconnection between an IP (internet protocol) network and the mobile communication network. The mobile communication network may include a mobile station (MS) and a base station (BS)/a mobile switching center (MSC)/an IWF (interworking function). The BS, the MSC, and the IWF may be collectively called an interworking facility.

In this event, the mobile station (MS) which is used in such a communication system may be operable in accordance with the Digital cellular method (interim standard) protocol prescribed by TIA (Telecommunication Industry Association)/EIA (Electronic Industry Association). Moreover, the mobile station (MS) is also operable in accordance with the IP (Internet Protocol). In this connection, a protocol of the mobile station is specified by a hiearchical structure which includes a relay layer, a link layer, a network layer, and an application layer. Specifically, the relay layer is formed by a Digital cellular method layer and a radio link protocol (RLP) layer defined by the Digital cellular method while the link layer is formed by a point-to-point protocol (PPP) layer. Moreover, the network layer is formed by a TCP (Transmission Control Protocol)/IP (Internet Protocol) layer.

On the other hand, the interworking facility, such as the base station (BS)/the mobile switching center (MSC)/the interworking function (IWF) is located between the mobile station (MS) and the IP network which is a connectionless network. The interworking facility has a protocol composed of the Digital cellular method layer and the RLP layer for the mobile station and a protocol composed of a physical (PHY) layer, a PPP layer, and an IP layer for the IP network.

At any rate, both the mobile station (MS) and the interworking facility are operable in accordance with the RLP prescribed by the Digital cellular method, as mentioned before.

Herein, it is to be noted that so called a high speed packet is defined as a service option 22, 23, 24, and 25 in the IS-95B and IS-707A among the Digital cellular method, so as to realize a connection between a mobile station and the IP network in accordance with the IP protocol.

In addition, it is to be considered that the transmission rate in the mobile communication system is very slow in comparison with the IP network because complex procedures should be executed so as to establish or release a connection and an overhead indispensably occurs to guarantee a radio quality. Taking this into account, the above-mentioned protocol IS-707A includes a RLP version 2 which is defined in connection with the high speed packet (mentioned above) in order to raise a transmission rate in communication with a mobile station. According to the RLP version 2, a plurality of radio channels are multiplexed between a mobile station and an interworking facility so as to improve transmission efficiency and to expand an available bandwidth. More specifically, the radio channels are simultaneously established in parallel between the mobile station and the interworking facility in the RLP version 2 and include, for example, a fundamental channel and first through eighth supplemental channels. The plurality of the radio channels are bundled to be subjected to multiprocessing and to expand the available bandwidth.

It is noted that the radio protocol, such as the RLP version 2, never recognizes, for example, a PPP frame, an IP protocol packet, and the like that belong to an upper layer and that the PPP frame and IP protocol packet are therefore transparently transmitted in accordance with the radio protocol.

Thus, neither consideration is made at all in the radio protocol about the PPP frame on multiprocessing the links nor definition is included in the upper protocol about multiplexing each radio link. Herein, a PPP link control frame, such as an end request frame, an echo request frame, should be transmitted as the PPP frame. On transmitting such a control frame in accordance with the radio protocol, the control frame is mixed with the other PPP frames for user data and multiplexed into radio channels. Such a mix of the control frame and the data frames makes it difficult to quickly detect the control frame on a reception side.

In other words, no guarantee is given about transmitting the control frame defined by the PPP protocol to a reception side, without any adverse influence to other radio channels. For example, let a sequence of PPP frames which includes a specific PPP frame be received by the interworking facility, such as BS/MSC/IWF, and transmitted through a plurality of radio channels to a mobile station in accordance with the radio protocol. The specific PPP frame may be, for example, a PPPLCP (link control protocol) echo request frame. In this event, each of the PPP frames is divided into the plurality of the radio channels. This means that the specific PPP frame is also dispersed or distributed into the plurality of the radio channels and is transmitted in the form of RLP frames to the mobile station.

In this connection, the mobile station should detect the specific PPP frame by decoding the RLP frames sent through the plurality of the radio channels. Such decoding requires complex control processing and complicated protocol processing over the plurality of the radio channels. In addition, a long time is required to execute such complex processing and transmission efficiency is reduced.

SUMMARY OF THE INVENTION

An aspect consistent with principles of the invention provides a communication system which is capable of improving transmission efficiency by dispensing with complex processing.

Another aspect consistent with principles of the invention provides a communication system of the type described, which can remove a delay resulting from complex protocol processing.

A further aspect consistent with principles of the invention provides a method which can effectively process and quickly transmit a control frame defined by the PPP.

To this end, this invention controls radio channels to carry out multiplexing transmission in a communication system which may be called a packet communication system. The communication system is operable in accordance with the Digital cellular method to carry out communication between a mobile station and an IP terminal included in a connectionless network.

A communication system according to an aspect of this invention comprises a mobile station operable in accordance with a predetermined mobile communication protocol and an internet protocol (IP) terminal operable in accordance with an IP. The predetermined mobile communication protocol allows use of a plurality of radio links between the mobile station and the IP terminal while the mobile station is communicable with the IP terminal. The communication system comprises an interworking apparatus which is operable in response to an IP frame defined by the IP and a plurality of radio frames defined by the predetermined mobile communication protocol. The interworking apparatus comprises framing means for framing each IP frame into PPP frames defined by the PPP, transmitting frame memory means which are assigned to the radio links, respectively, for storing the PPP frames one by one, respectively, and transmitting means for transmitting the stored PPP frames through the plurality of the radio links in the form of the radio frames, respectively.

The transmitting means may comprise converting means for converting the PPP frames stored in the frame memories into a plurality of radio link protocol (RLP) frames and radio frame memory means which are made to correspond to the radio links, respectively, for individually storing each of the RLP frames to make the transmitting means transmit each RLP frame as each of the radio frames.

In addition, the interworking apparatus may further comprise receiving means for receiving the plurality of the radio frames through the plurality of the radio links, respectively, reception frame memory means for individually storing the radio frames at every one of the radio frames, and reproducing means for reproducing the radio frames into corresponding PPP frames.

Furthermore, the interworking apparatus further comprises sending means for sending the PPP frames to the IP terminal after the PPP frames are converted into IP frames, when the reproduced PPP frames are IP frames.

In this event, the transmitting frame memory means may comprise a plurality of frame memories which are equal in number to the radio links assigned to the interworking apparatus. The interworking apparatus further comprises reception frame control means for assigning the PPP frames sent from the framing means to the respective frame memories and transmission frame control means for successively reading the radio frames out of the reception frame memory means.

The number of the plurality of the frame memories of the transmitting frame memory means is changed with reference to the number of the radio links.

An interworking apparatus to which this invention is applicable is located between a mobile station and an IP terminal so as to carry out mutual conversion between Digital cellular method and the IP protocol. The mobile station is operable in accordance with both the Digital cellular method and the IP protocol while the IP terminal is operable in accordance with the IP protocol. According to another aspect of this invention, the interworking apparatus comprises an IP protocol interface for executing interface processing of the IP protocol to produce IP frames, a radio protocol interface for executing interface processing of a radio protocol to produce radio frames, a framing portion responsive to the IP frames, for framing the IP frames into PPP frames, a reception frame control portion for assigning the respective IP frames at every one of radio links, PPP frame memory means for individually storing the PPP frames at every one of the radio links determined in number under control of the reception frame control portion, RLP converting means for converting the PPP frames stored in the frame memories into RLP frames equal in number to the PPP frames, frame transmitting means which are made to correspond to the RLP converting means for transmitting the RLP frames through the radio interface to a radio transmission path, radio reception means for receiving, through the radio interface, RLP frames sent from the radio links determined in number, RLP frame memory means, the number of which is determined in accordance with the radio links, for successively storing each of the RLP frames, a transmission frame control portion for successively reading the RLP frames out of the RLP frame memory means, reproducing means for reproducing the RLP frames read out of the RLP frame memory means into corresponding PPP frames, to convert the PPP frames into the IP packets on detection of the IP frame.

In this event, the mobile station negotiates with the radio interface prior to communication with the interworking apparatus, in connection with the number of the radio links in a forward direction from the interworking apparatus to the mobile station and in a reverse direction from the mobile station to the interworking apparatus. Under the circumstances, the radio interface informs the reception frame control portion and the transmission frame control portion of the agreed number of the radio links obtained as a result of the negotiation. In addition, the numbers of the PPP frame memory means and the RLP frame memory means are determined in response to the agreed number of the radio links.

According to another aspect of this invention, a mobile station comprises the interworking apparatus mentioned above.

According to yet another aspect of this invention, an interworking apparatus is for use in carrying out conversion of Digital cellular method and IP protocol so as to mutually connect between a mobile station and an IP terminal. The interworking apparatus comprises an IP protocol interface for carrying out IP protocol interface processing to produce IP packets, an radio interface for carrying out radio protocol interface processing, a framing portion responsive to the IP packets sent from the IP protocol interface for framing the IP packets into PPP frames, a reception frame control portion for assigning the PPP frames framed by the framing portion at every one of radio links, a plurality of PPP frame memories for storing the PPP frames sent from the framing portion, at every one of the radio links, a plurality of RLP converting portions, which correspond to the respective PPP frame memories, for converting the PPP frames read out of the PPP frame memories into RLP frames, respectively, a plurality of frame transmission portions, which correspond to the respective RLP converting means, for transmitting the RLP frames sent from the RLP converting means to radio transmission paths through the radio interface, a plurality of frame reception portions, supplied with RLP frames sent through the radio links, for distributing the RLP frames at every one of radio links, a plurality of RLP frame memories for successively storing the RLP frames sent from the frame reception portions, a transmission frame control portion for successively reading the RLP frames out of the RLP frame memories, a reproducing portion for reproducing the RLP frames read out of the RLP frame memories into PPP frames to supply IP packets to the IP protocol interface by converting the PPP frames into the IP packets on detection of the IP protocol frames. The reception frame control portion and the transmission frame control portion are given the numbers of the radio links which are determined in relation to a forward direction from the interworking apparatus to the mobile station and a reverse direction from the mobile station to the interworking apparatus. The reception and the transmission frame control portions vary available numbers of the PPP frame memories and the RLP frame memories with reference to the numbers of the radio links.

In this case, the transmission frame control portion processes frames read out of the RLP frame memories when the frames read out of the RLP frame memories are PPP link control frames.

According to still another aspect of this invention, a communication system is for use in connecting a mobile station through an interworking apparatus to a packet terminal included in a connectionless network. The interworking apparatus comprises a first group of frame memories for storing PPP frames produced from reception packets at every one of radio links, means for reading the PPP frames read out of the first group of the frame memories to convert the PPP frames into radio frames and to produce the radio frames through the radio links, respectively, a second group of frame memories for storing radio frames sent through radio links at every one of the radio frames, and reproducing means for reproducing the radio frames read out of the second group of the frame memories into PPP frames.

According to another aspect of this invention, a method is for use in establishing a connection between a mobile station and a terminal of a connectionless network through an interworking apparatus. The method comprises the steps of providing multiplexed radio links between the mobile station and the interworking apparatus, successively storing radio frames sent through the radio links in those RLP frame memories of the interworking apparatus which are determined for every one of the radio links, successively reproducing the radio frames into PPP frames, and delivering PPP frames sent from the terminal to PPP frame memories located at every one of the radio links to convert the PPP frames into radio frames and to produce the radio frames through the radio links, respectively.

DESCRIPTION OF THE PREFERRED EMBODIMENTS

Figure 1:
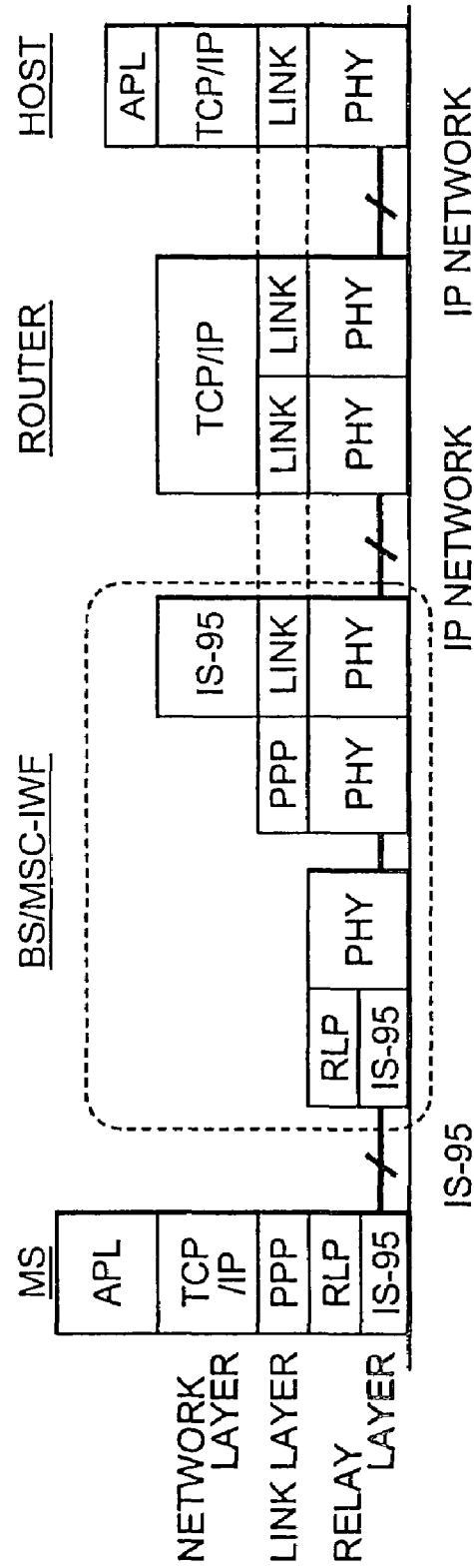
FIG. 1 is a diagram for use in describing a protocol stack used in a communication system.

Referring to FIGS. 1 through 4, description will be made about a communication system to which this invention is applicable, for a better understanding of this invention. As shown in FIG. 1, the communication system has an IP network and a mobile communication network which is interconnected to the IP network and which may be operable in accordance with the Digital cellular method. The illustrated IP network is specified by a router and a host while the mobile communication network is specified by a mobile station (MS) and BS/MSC/IWF, as mentioned before. In FIG. 1, illustration is made of protocols which have layer structures. Specifically, each protocol of the router and the host in the IP network has a physical layer (PHY), a link layer (LINK), and a network layer of TCP/IP. The protocol of the host has also an application layer (APL) as an uppermost layer.

On the other hand, the protocol of the illustrated mobile station (MS) is specified by a combination of a lower protocol defined by the TIA (Telecommunications Industry Association)/EIA (Electronic Industry Association)/Digital cellular method and an upper protocol defined by the IP protocol, such as PPP, TCP/IP. The lower protocol is composed of the Digital cellular method related to CDMA and the radio link protocol (RLP).

The BS/MSC/IWF which is placed between the IP network and the MS has the protocols of the physical layer (PHY), the link layer (LINK), and the IP layer on the IP network side and the protocols of the Digital cellular method and the RLP on the MS side.

Figure 2:
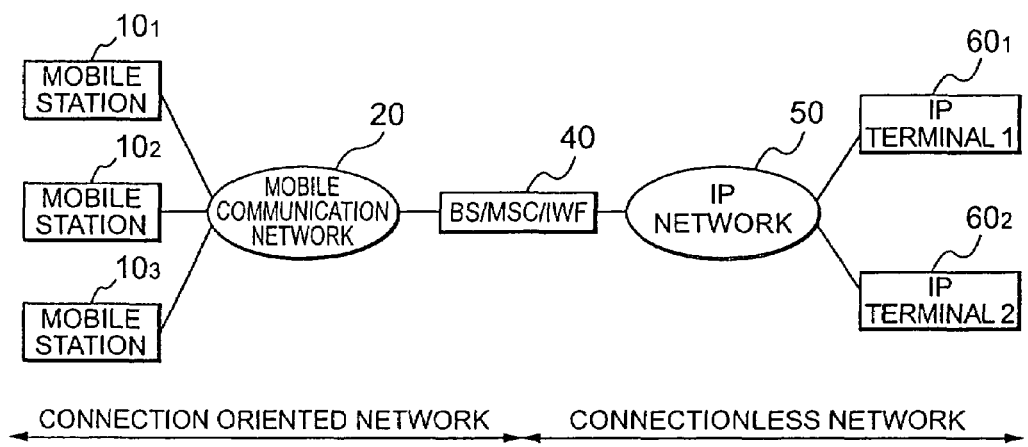
FIG. 2 is a block diagram of a packet communication system to which this invention is applicable.

In FIG. 2, a communication system is illustrated which can carry out communication between a connection oriented network and a connectionless network. The connectionless network is assumed to be operated in compliance with the IS-95B and IS-707A. More specifically, it is also surmised that the connectionless network uses a high speed packet prescribed as the service option in 22, 23, 24, and 25 and carries out communication through an interworking apparatus.

Furthermore, the illustrated communication system has the connection oriented network formed by a plurality of mobile stations $10_1$ to $10_3$, a mobile communication network 20, and a radio end terminal or an interworking facility 40, such as BS/MSC/IWF. The mobile station $10_1$ to $10_3$ are operable in accordance with both the above-mentioned RLP of the Digital cellular method and the IP protocol while the radio end terminal 40 is operable as a protocol end of a radio region. As mentioned before, the radio end terminal 40 can transmit the high speed packet in compliance with the IP protocol and the IS-707A.

As shown in FIG. 2, the connection oriented network is connected to the connectionless network which includes a part of the radio end terminal 40, the IP network 50 and a plurality of the IP terminals $60_1$ and $60_2$. The IP network 50 is connected to both the radio end terminal 40 and the IP terminals $60_1$ and $60_2$.

In the illustrated example, a sequence of user data is generated by each IP terminal $60_1$ and $60_2$, and is formulated in accordance with the IP protocol. Thereafter, the user data sequence is transmitted from each of the IP terminals $60_1$ and $60_2$ to each of the mobile stations $10_1$ to $10_3$ after it is framed by the use of the PPP RFC 1662 and is further framed by the RLP of the radio protocol defined by the IS-707A.

Specifically, the user data sequence is framed into a PPP frame in accordance with the PPP; RFC (Request For Comment) 1662 and is thereafter further framed into a RLP frame in accordance with the radio protocol of IS-707A.

It is to be noted here that a transmission rate in the mobile communication system is very slow because of an overhead required for radio quality and procedures for establishment/release of connection. Taking this into consideration, the above-mentioned IS-707A includes the RLP type 2 standard of multiplexing a plurality of radio links so as to raise up a transmission rate of each mobile station. Actually, the RLP type 2 standard serves to improve transmission efficiency and to expand an available bandwidth.

Figure 3:
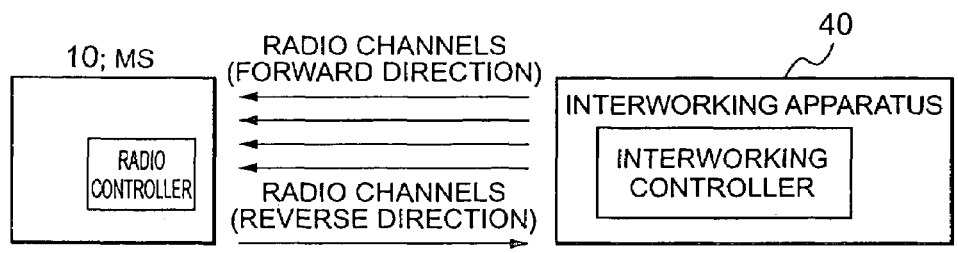
FIG. 3 is a view for use in describing a radio link control operation.

As shown in FIG. 3, the above-mentioned RLP type 2 standard is related to radio links or channels between the mobile station (MS) 10 and the radio end terminal 40. The radio links or channels are divided into forward radio channels from the radio end terminal 40 to the mobile station (MS) 10 and reverse radio channels from the mobile station (MS) 10 to the radio end terminal 40. In the illustrated forward radio channels, a plurality of the forward radio channels are bundled for multiplexing and are simultaneously established. The plurality of the forward radio channels include a single fundamental radio channel and supplemental radio channels which may be selectively established from one to eight.

Such a radio protocol makes it possible to transparently transmit the PPP frame without recognizing the PPP frame and the IP protocol.

On multiplexing the plurality of the radio links or channels, neither consideration is made in the above-mentioned radio protocol about the PPP frame nor definition is also made about multiplexing the radio channels.

Herein, it is to, be noted that the PPP frame is classified into a PPP user data frame for carrying a user data sequence and a PPP link control frame for sending an end request, an echo request, and the like. With the above-mentioned radio protocol, the PPP link control frame is multiplexed into the radio channels together with the PPP user data frame. In other words, the PPP link control frame coexists with the PPP user data frame in the radio channels.

Therefore, a reception side 10 of the PPP frame can not quickly detect the PPP link control frame. This means that the PPP link control frame can not be transmitted without any influence to any other radio channels.

Figure 4:
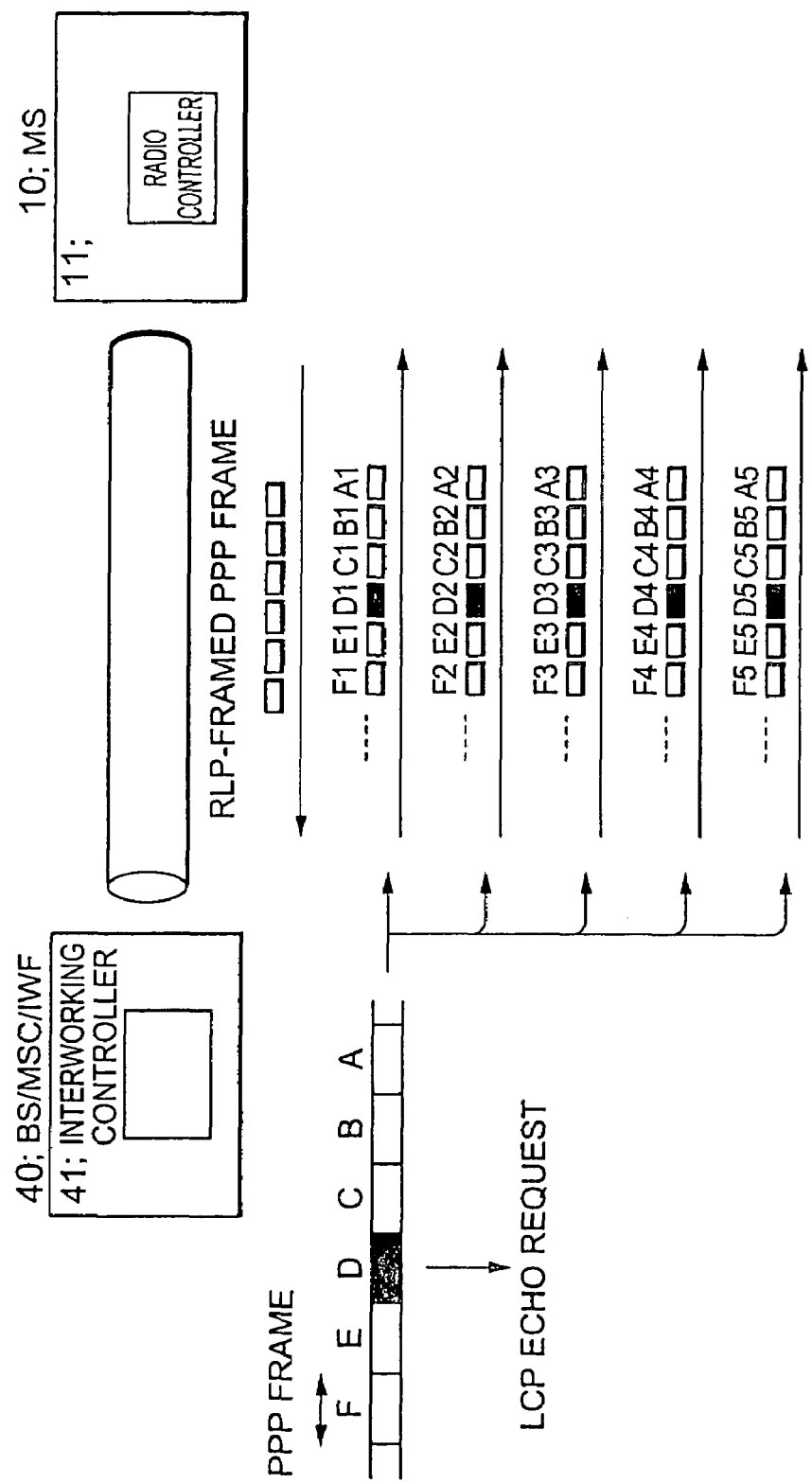
FIG. 4 is a view for use in describing the radio link control operation in detail.

More particularly, it is assumed in FIG. 4 that the BS/MSC/IWF 40 and the mobile station (MS) have an interworking controller 41 and a radio controller 11, respectively, and that a sequence of PPP frames A to F is successively transmitted from the interworking controller 41 to the radio controller 11. In the illustrated example, the PPP frame D is assumed to carry an LCP (link control protocol) echo request. According to the above-mentioned radio protocol, each of the PPP frames A to F is divided into first through fifth pieces of the frames, such as A1 to A5; B1 to B5: C1 to C5; D1 to D5; E1 to E5; and F1 to F5; which are transmitted through first to fifth ones of the radio channels, as illustrated in FIG. 4. In other words, the radio controller 11 of the mobile station (MS) is given first through fifth ones of RLP-framed PPP frames in the illustrated manner.

Under the circumstances, the radio controller 11 of the mobile station (MS) 10 should decode and judge each RLP-framed PPP frame so as to detect the LCP echo request carried by the PPP frame F. Such decoding and judging require complicated processing. This means that sequential control of the PPP frames should be executed over a plurality of the radio channels. In consequence, processing delays inevitably take place due to the complicated processing and transmission efficiency is reduced, as mentioned in the preamble of the instant specification.

Figure 5:
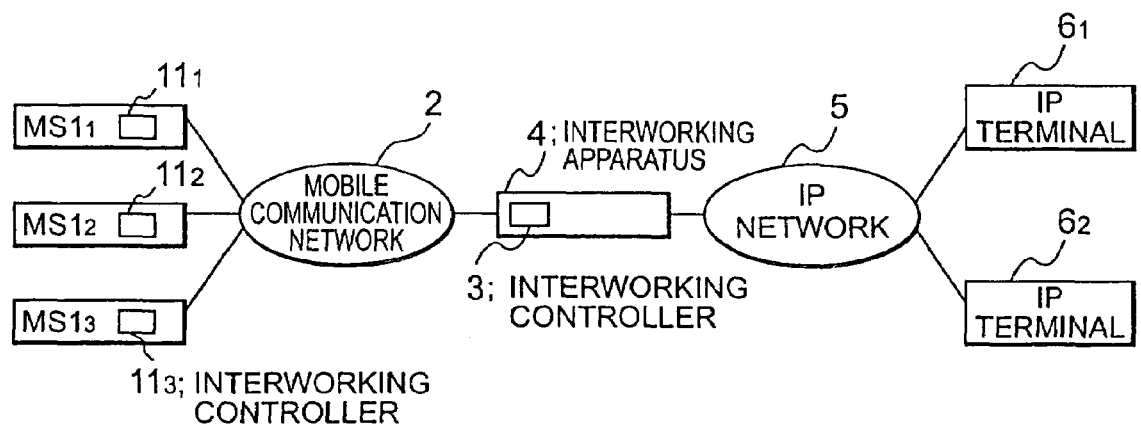
FIG. 5 is a block diagram of a communication system according to a preferred embodiment of this invention.
Figure 6:
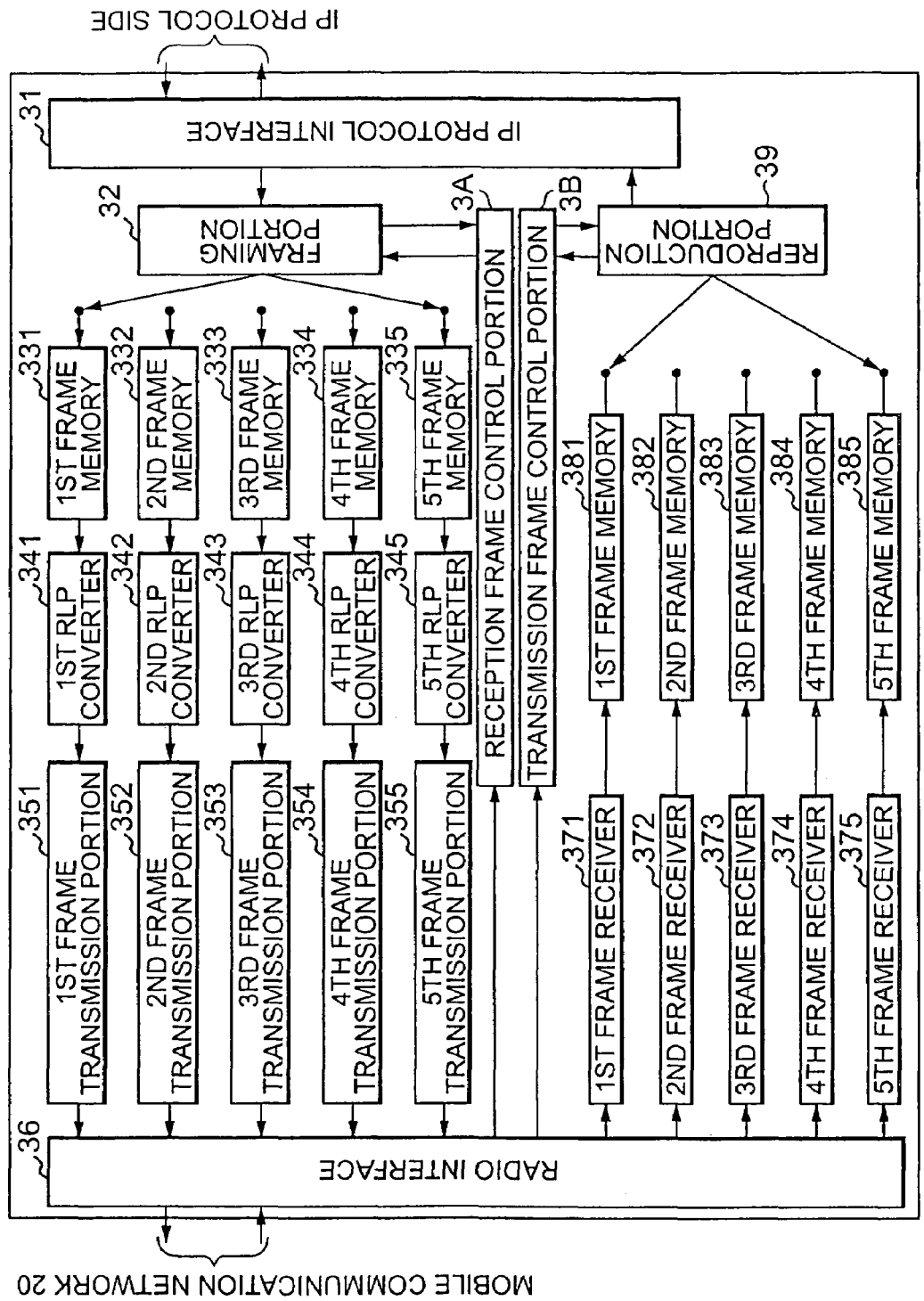
FIG. 6 is a block diagram of an interworking apparatus used in the communication system illustrated in FIG. 5.

Referring to FIGS. 5 and 6, a communication system according to a preferred embodiment of this invention comprises a plurality of mobile stations $MS1_1$ to $MS1_3$, a mobile communication network 2 (which may be called a radio transmission path), an interworking facility 4, and an IP network 5, and a plurality of IP terminals $6_1$, $6_2$. The illustrated interworking facility 4 is operable in a manner somewhat different from the radio end terminal 40 illustrated in FIG. 2, as will become clear as the description proceeds.

The IP terminals $6_1$ and $6_2$ may be coupled to the IP network 5 and have IP interfaces which cany out communication through a network medium, such as Ethernet, ATM (Asynchronous Transfer Mode), or a frame relay.

In the illustrated example, each of the mobile stations $MS1_1$ to $MS1_3$ has an interworking controller $11_1$ to $11_3$ while the interworking facility 4 has an interworking controller 3 which may be similar in structure and operation to each of the interworking controllers $11_1$ to $11_3$.

In FIG. 5, it is assumed that the interworking controllers 11 may be used as the interworking controller 3, although they can be also used as the interworking controller 11 in each mobile station MS1 to 3. In this connection, each of the interworking controllers 111 to 113 and 3 may be collectively often called an interworking apparatus.

In addition, it is also assumed that the illustrated interworking controller 3 is now assigned five radio channels or links, although the number of the radio channels or links may not be restricted to five but can be changed to any other number, for example, eight or so by negotiation. At any rate, the interworking controller 3 is given the number of the radio channels agreed or consented by the negotiation.

As shown in FIG. 6 the interworking controller 3 has an IP protocol interface 31 located on the IP network side and a radio interface 36 on the mobile communication network side. The IP protocol interface 31 is operable to receive/send an IP packet from/to the IP terminal $6_1$, $6_2$, while the radio interface 36 is operable to execute radio protocol interface processing in accordance with a radio protocol.

Moreover, the IP protocol interface 31 is coupled to a framing portion 32 which serves to frame the IP packets into PPP frames. Each PPP frame is successively stored into first through fifth frame memories 331 to 335 one by one. In other words, each of the first through the fifth memories 331 to 335 stores each PPP frame at every PPP frame and may be referred to as transmitting frame memories.

In addition, the first through fifth frame memories 331 to 335 are connected to first through fifth RLP (Radio Link Protocol) converters 341 to 345, respectively. The first through the fifth RLP converters 341 to 345 are operable to convert the PPP frames read out of the PPP frame memories 331 to 335 into radio frames in accordance with the RLP, respectively. The converted radio frames are sent from the first through the fifth RLP converters 341 to 345 to first through fifth frame transmission portions 351 to 355 and are thereafter transmitted from the first through fifth frame transmission portions 351 to 355 through the radio interface 36 to the mobile communication network 20. To this end, the radio interface 36 carries out the radio protocol interface processing.

Taking the above into consideration, the converters 341 to 345 and the frame transmission portions 351 to 355 may be called a radio frame transmission portion.

Furthermore, the illustrated interworking controller 3 further has first through fifth frame receivers 371 to 375 connected to the radio interface 36 which are operable to receive radio frames from the mobile communication network 20 through the radio interface 36. Such radio frames are received by the interworking controller 3 through first through fifth radio channels or links agreed by the negotiation, as mentioned before. The received radio frames are individually sent to first through fifth frame memories 381 to 385 each of which serves to store the radio frames at every PPP frame and which may therefore be called RLP frame memories. The radio frames stored in the first through the fifth frame memories 381 to 385 are reproduced by a reproduction portion 39 into PPP frames which are sent through the IP protocol interface 31.

In addition, the interworking controller 3 illustrated in FIG. 5 has a reception frame control portion 3A coupled to the framing portion 32 and the radio interface 36 and a transmission frame control portion 3B coupled to the radio interface 36.

Now, operation will be described with reference to FIGS. 5 and 6. At first, let transmission be carried out from the mobile station MS1 to the IP terminal 6 in the reverse direction. In this event, the mobile station MS1 negotiates with the radio interface 36 of the interworking controller 3 about the number of forward links or channels and the number of reverse links or channels, prior to communicating with the interworking facility 4. Herein, the forward channels are formed in the forward direction from the interworking facility 4 while the reverse channels are formed in the reverse direction from the mobile station MS1 to the interworking facility 4.

As a result of the negotiation, the radio interface 36 of the interworking facility 4 informs the reception frame control portion 3A and the transmission frame control portion 3B of the agreed numbers of the radio links. Thus, the interworking controller 3 sets the numbers of the radio channels and the numbers of both the first through the fifth PPP frame memories 331 to 335 and the first through the fifth RLP frame memories 381 to 385 in the illustrated example. Thus, the numbers of the radio channels and/or the frame memories are set as the result of negotiation and may be referred to as agreed or accepted numbers.

Under the circumstances, the PPP frame memories 331 to 335 are managed with reference to the numbers of the radio links in the forward direction by the reception frame control portion 3A and store the PPP frames concerned with the corresponding radio channels. On the other hand, the RLP frame memories 381 to 385 are managed by the transmission frame control portion 3B of the interworking controller 3 with reference to the numbers of the radio links in the reverse direction and store the RLP frames concerned with the corresponding radio links.

Now, the PPP frames generated by the mobile station MS1 are framed within the mobile station MS1 into the RLP frames and are sent through the mobile communication network 2 to the interworking controller 3 of the interworking facility 4. In the interworking facility 4, the RLP frames are received through the radio interface 36 of the interworking controller 3 by the first through the fifth frame receivers 371 to 375 thereof.

The RLP frames received by the first through the fifth frame receivers 371 to 375 are stored in the first through the fifth frame memories 381 to 385. It is to be noted here that each RLP frame is given to the interworking controller 3 at every radio link and may not be separated or spread into the first through the fifth RLP frame memories 381 to 385.

When each of the RLP frames that corresponds to a single one of the PPP frame is stored in every one of the first through the fifth RLP frame memories 381 to 385, the transmission frame control portion 3B reads each RLP frame out of the first through the fifth RLP frame memories 381 to 385 and sends it to the reproduction portion 39.

The reproduction portion 39 successively receives the RLP frames read out of the frame memories 381 to 385 and reproduces or regenerates the PPP frames. When the PPP frame includes the IP protocol frame, the IP protocol frame is converted into the IP protocol packet by the reproduction portion 39 to be sent to the IP protocol interface 31. When the PPP frame includes the PPP link control frame, the PPP link control frame is processed by the transmission frame control portion 3B to be subjected to predetermined processing.

On the other hand, consideration will be made about transmitting the IP protocol packet from the interworking controller 3 to the mobile station MS1. In this event, the IP protocol packet is given through the IP protocol interface 31 to the framing portion 32 and is framed into the PPP frame by the framing portion 32. Each PPP frame is successively delivered to the first through the fifth PPP frame memories 331 to 335 to be stored therein under control of the reception frame control portion 3A. Thus, the PPP frame memories are loaded with the PPP frames which are made to correspond to the radio channels in number.

In general, the radio interface 36 is slow in speed in comparison with the IP protocol interface 31. Therefore, the PPP frames should be quickly stored in the PPP frame memories 331 to 335. For example, when framing operation of the RLP frame is not finished in connection with a certain one of the PPP frame memories, the reception frame control portion 3A may wait for completion of the RLP frame without any output operation.

In addition, the reception frame control portion 3A may give any priority to each radio link and control an output order of the frames stored in the PPP frame memories 331 to 335, with reference to the priority.

The first through the fifth RLP converters 341 to 345 are supplied with the PPP frames from the first through the fifth PPP frame memories 331 to 335 and frame them in accordance with the radio protocol into the RLP frames which are dispersed to delivered to the first through the fifth transmission portions 351 to 355. In this event, each RLP frame is sent from the corresponding RLP converter 341 to 345 to the corresponding frame transmission portion 351 to 355 and is supplied to the mobile communication network 30. Therefore, controlling the individual RLP frames is not needed in the illustrated example.

In the embodiment according to this invention, when the radio links or channels are multiplexed in accordance with the radio protocol, the frame memories for storing the radio frames are set so that they are made to correspond to the radio links. With this structure, the radio frames for each mobile station are sent from the frame memory corresponding to each radio link or channel. On the other hand, when the radio frame is received, the radio frame is stored in the RLP frame memory corresponding to each radio link and is read out of the RLP frame memory. At any rate, each radio link is assigned to the corresponding PPP frame. In other words, the PPP frames is transmitted to the corresponding radio link at every one of the PPP frames.

As a result, the control frame which may be, for example, the end request frame, the echo request frame, and which is defined in the PPP protocol can be reliably transmitted to the opposite mobile station without any influence to the other radio channels or links. This results in dispensing with complex protocol processing, such as sequential control processing of the PPP frames carried out over the plurality of the radio links. Accordingly, it is possible to realize the communication system which has a reduced protocol processing delay and improved transmission efficiency.

While this invention has thus far been described in conjunction with a preferred embodiment thereof, it will readily be possible for those skilled in the art to put this invention into practice in various other manners. For example, this invention is not always restricted to the mobile station and the interworking apparatus operable in response to the PPP frames.

What is claimed is:

1. A communication system configured to communicate with a mobile station operable in accordance with a mobile communication protocol and a terminal operable in accordance with an Internet protocol (IP), the mobile communication protocol configured to allow use of a plurality of radio links between the mobile station and the communication system, the communication system comprising:
    framing means for framing received IP frames into point-to-point protocol (PPP) frames;
    transmitting frame memory means assigned to the plurality of radio links for storing the PPP frames, the transmitting frame memory means comprising a plurality of frame memories which are equal in number to a number of radio links used to communicate with the mobile station;
    reception frame control means for assigning the PPP frames generated by the framing means to the plurality of frame memories; and
    transmitting means for transmitting the stored PPP frames through the plurality of radio links in the form of the radio frames.

2. The communication system of claim 1, wherein the mobile communication protocol is a radio link protocol (RLP) and the transmitting means further comprises:
    converting means for converting the PPP frames stored in the plurality of frame memories into a plurality of RLP frames; and
    radio frame memory means, corresponding to the plurality of radio links, for storing the RLP frames.

3. The communication system of claim 1, further comprising:
    receiving means for receiving a plurality of radio frames through the plurality of radio links;
    reception frame memory means for storing the radio frames; and
    converting means for converting the radio frames into PPP frames.

4. The communication system of claim 3, wherein the converting means converts the PPP frames to IP frames, the system further comprising:
    sending means for sending the IP frames to the terminal.

5. The communication system of claim 3, further comprising:
    transmission frame control means for reading the radio frames out of the reception frame memory means.

6. The communication system of claim 1, wherein the number of the plurality of the frame memories is configured to change based on the number of radio links used to communicate with the mobile station.

7. The communication system of claim 6, wherein the number of radio links ranges from one to eight.

8. An apparatus, comprising:
    an Internet protocol (IP) interface configured to receive and transmit IP frames;
    a radio interface configured to receive and transmit radio frames;
    a framer configured to frame received IP frames into point-to-point protocol (PPP) frames;
    a first controller configured to assign the received IP frames to one of a plurality of radio links;
    at least one PPP frame memory configured to store the PPP frames;
    at least one radio link protocol (RLP) converter configured to convert the PPP frames stored in the at least one PPP frame memory into RLP frames;
    at least one transmitter configured to transmit the RLP frames via the radio interface;
    at least one RLP frame memory coupled to the radio interface and configured to store the RLP frames received via the radio interface;
    a second controller configured to read RLP frames out of the at least one RLP frame memory; and
    a converter configured to convert the RLP frames read out of the at least one RLP frame memory into IP packets.
    wherein the apparatus is further configured to:
    communicate with a mobile station to negotiate a first number of radio links from the apparatus to the mobile station.

9. The apparatus of claim 8, wherein when converting the RLP frames read out of the at least one RLP frame memory to IP packets, the converter is configured to:
    convert the RLP frames to PPP frames, and
    convert the PPP frames to IP packets.

10. The apparatus of claim 8, wherein the radio interface is further configured to:
    inform the first controller of the first number of radio links.

11. The apparatus of claim 8, wherein the at least one PPP frame memory corresponds in number to the first number of radio links.

12. The apparatus of claim 8, wherein the apparatus is further configured to:
    communicate with the mobile station to negotiate a second number of radio links from the mobile station to the apparatus.

13. The apparatus of claim 12, wherein the radio interface is further configured to:
    inform the second controller of the second number of radio links.

14. The apparatus of claim 12, wherein the at least one RLP frame memory corresponds in number to the second number of radio links.

15. An apparatus for facilitating communications between a mobile station and an Internet protocol (IP) terminal, comprising:
    an IP interface configured to receive and transmit IP packets;
    a radio interface configured to receive and transmit radio frames;
    a plurality of radio frame memories coupled to the radio interface and configured to store the received radio frames;
    a first control portion configured to:
        read the radio frames out of the radio frame memories, and
        vary an available number of radio frame memories based on a number of radio links from the mobile station to the apparatus; and
    an IP converter configured to convert the radio frames read out of the radio frame memories to IP packets.

16. The apparatus of claim 15, wherein when converting radio frames to IP packets, the IP converter is configured to:
    convert the radio frames to point-to-point protocol (PPP) frames, and
    convert the PPP frames to IP packets.

17. The apparatus of claim 15, further comprising:
    a framer configured to receive IP packets from the IP interface and convert the IP packets into point-to-point protocol (PPP) frames;

a second control portion configured to assign each PPP frame to one of a plurality of radio links;

a plurality of PPP frame memories configured to store the PPP frames;

at least one radio converter configured to convert PPP frames stored in the plurality of PPP frame memories into radio frames; and at least one transmitter configured to transmit the radio frames via the radio interface.

18. The apparatus of claim 17, wherein the second control portion is further configured to vary an available number of PPP frame memories based on a number of radio links from the apparatus to the mobile station.

19. The apparatus of claim 15, wherein the apparatus is configured to:

negotiate with the mobile station to determine the number of radio links from the apparatus to the mobile station, and negotiate with the mobile station to determine the number of radio links from the mobile station to the apparatus.

20. A communication device for use in facilitating communications between a mobile station and a terminal, the communication device comprising:

a first group of frame memories corresponding to a plurality of radio links used to transmit data to the mobile station, the first group of frame memories being configured to store point-to-point (PPP) frames produced from received packets;

at least one radio converter configured to convert the PPP frames stored in the first group of frame memories into radio frames;

a second group of frame memories configured to store radio frames received from the mobile station via radio links; and a PPP converter configured to convert the radio frames stored in the second group of frame memories into PPP frames.

21. The communication device of claim 20, wherein the PPP converter is further configured to convert the PPP frames to Internet protocol packets.

22. The communication device of claim 20, wherein the second group of frame memories corresponds in number to a number of radio links used to transmit radio frames by the mobile station to the communication device.

23. In a network device, a method of establishing a connection between a mobile station and a terminal, comprising:

storing radio frames received via radio links in radio link protocol (RLP) frame memories, the number of the RLP frame memories corresponding in number to a number of radio links used to transmit the radio frames from the mobile station to the network device;

converting the radio frames into point-to-point (PPP) frames;

storing PPP frames received from the terminal to PPP frame memories, the number of PPP frame memories corresponding in number to a number of radio links used to transmit the PPP frames from the network device to the mobile station; and converting the stored PPP frames into radio frames for transmission via the radio links.

* * * * *